July 3, 1934.  W. ZWAYER  1,965,064
EXPANSIBLE CHAMBER MOTOR
Filed April 18, 1932
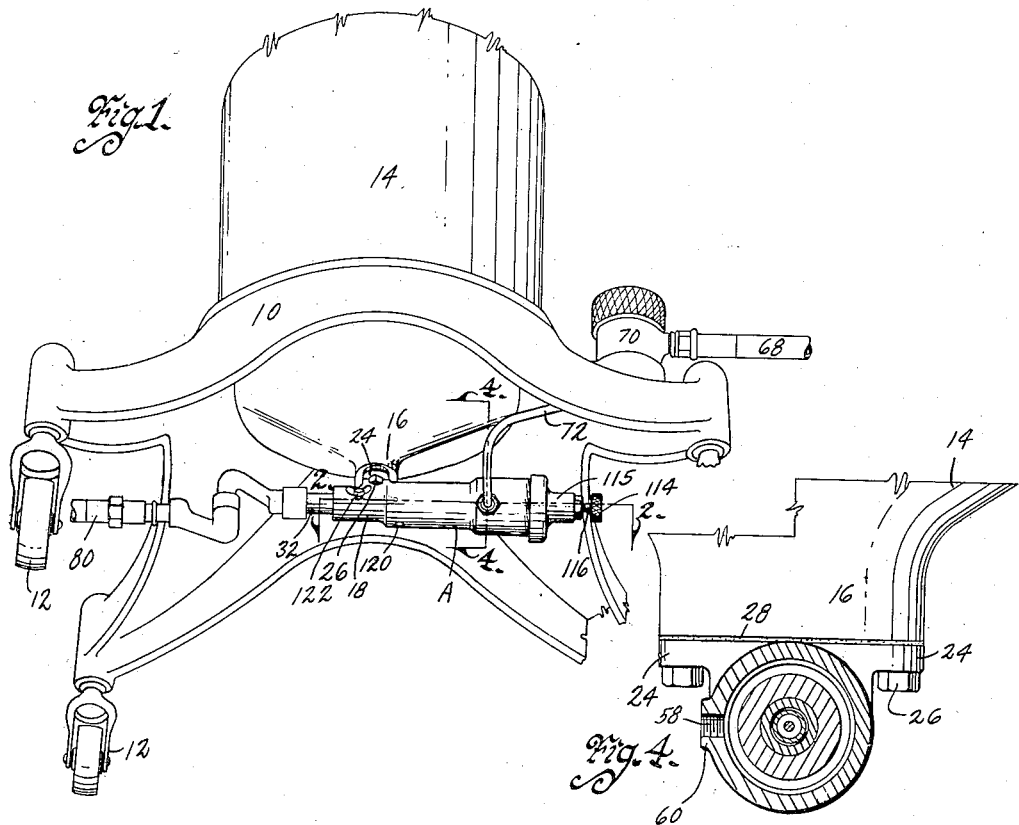
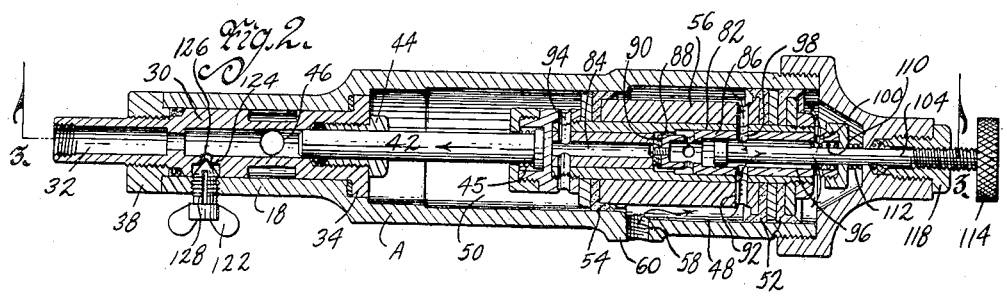
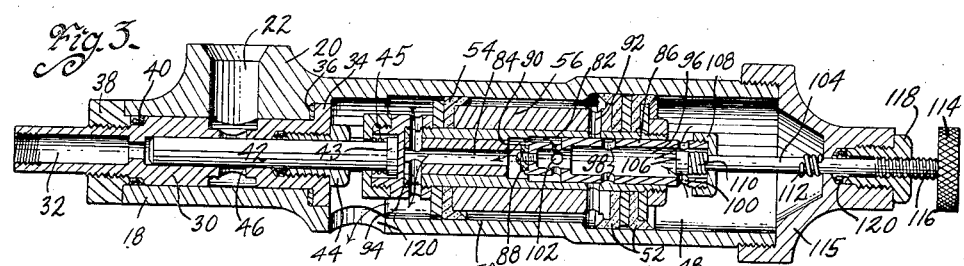
Inventor: William Zwayer
by Bair, Freeman & Sinclair
Attorneys
Witness
Edw Seeley Patented July 3, 1934

1,965,064

UNITED STATES PATENT OFFICE 1,965,064

EXPANSIBLE CHAMBER MOTOR

William Zwayer, Bryan, Ohio, assignor to The Aro Equipment Corporation, a corporation of Ohio Application April 18, 1932, Serial No. 605,944

1 Claim. (Cl. 121—123)

An object of my invention is to provide a lubricant dispensing mechanism or pump of simple and inexpensive construction, adapted for mounting on a lubricant container and operated by compressed air or the like to pump lubricant from the container into a hose or the like for lubricating purposes.

A further object is to provide an operating mechanism for a lubricating pump of reciprocating character, which when compressed air is admitted thereto will start reciprocation of the mechanism and such reciprocation will continue as long as air is supplied to the mechanism.

A further object is to provide the mechanism in the form of a primary air cylinder and a reduced air cylinder, with a piston in each cylinder and an automatically operated valve for admitting air to the cylinders and discharging it therefrom to cause the intermittent reciprocation of the pistons required for operating the lubricant pump.

A further object is to provide means for readily adjusting the stroke of the pump.

A further object is to provide in connection with the pair of pistons a valve which in one position admits compressed air to the cylinders between the pistons to cause reciprocation of the pistons in one direction, and when in another position admits the compressed air also to one of the cylinders on the opposite side of the piston therein to cause reciprocation of the piston in the other direction.

A further object is to provide the valve operable to discharge air from one of the cylinders to permit the piston therein to advance into the cylinder during one half of the cycle of operation of the pistons.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:—

Figure 1 is a perspective view of a lubricant dispensing mechanism mounted on the bottom of a wheeled lubricant tank, the device being tipped up to better show the construction.

Figure 2 is a horizontal longitudinal sectional view on the line 2—2 of Figure 1, showing the lubricant dispensing mechanism on an enlarged scale.

Figure 3 is a sectional view on the line 3—3 of Figure 2; and

Figure 4 is a sectional view on the line 4—4 of Figure 1.

On the accompanying drawing I have used the reference numeral 10 to indicate a base which preferably is wheeled, casters 12 being shown for supporting it. A lubricant container 14 is mounted on the base 10 and is provided with a discharge neck 16 at its lower end.

My lubricant dispensing mechanism includes a lubricant pump and operating mechanism therefor, indicated generally by the reference character A. The mechanism A includes a sleeve 18 having a boss 20 with a lubricant inlet 22 formed therein. The boss 20 is provided with perforated ears 24 whereby the sleeve 18 and consequently the mechanism A may be secured to the neck 16 by cap screws 26 or the like. A suitable gasket 28 may be interposed between the boss and the neck to prevent leakage at this point.

Within the sleeve 18 I provide a sleeve-like lubricant cylinder 30 having a discharge nipple 32. The sleeve-like cylinder is provided with a flange-like head 34 retained against a gasket 36 by a nut 38, packing being provided at 40 to insure against leakage.

Within the cylinder 30 I provide a lubricant plunger 42 which is reciprocable therein. A packing nut 44 serves the purpose of preventing leakage of lubricant between the plunger 42 and the head 34 of the cylinder 30. The cylinder 30 is provided with intake openings 46 communicating with the inlet 22, which in turn communicates with the lubricant or storage tank 14 through the neck 16, which of course is hollow.

Formed as an extension of the sleeve 18 I provide a primary air cylinder 48 and a reduced air cylinder 50. By "reduced" I mean that it is of smaller diameter than the diameter of the primary cylinder 48. A double cup leather piston 52 is provided in the primary cylinder 48, while a single cup leather piston 54 is provided in the reduced cylinder 50. The pistons 52 and 54 are operatively connected together for simultaneous reciprocation by a sleeve member 56 and other associated parts, including threaded nuts, as will be obvious from a detailed inspection of the drawing.

I provide a compressed air inlet 58 extending through a boss 60 of the cylinder 48. This inlet, it will be noted, communicates with the space in the cylinders 48 and 50, between the pistons 52 and 54 therein. A compressed air hose 68 connects with the inlet 58 through an air strainer 70 and piping 72.

As shown on the drawing, parts are built up through the sleeve member 56 and the pistons 52 and 54, which contain bores 82 and 84. Slidable in the bore 82 is a valve sleeve 86 which has a valve member 88 thereon adapted to seat on a valve seat 90 which is in communication with the bore 84.

Compressed air openings 92 and 94 extend from the interior of the sleeve member 56 to a bore 96 in the valve sleeve 86 and from the bore 84 to the space within the cylinder 50 respectively. The valve sleeve 86 is provided with ports 98 which are adapted at times to register with the compressed air openings 92.

Other ports 100 are provided in the sleeve 86 which provide communication between the bore 96 of the valve sleeve and the space in the primary air cylinder 48 on the opposite side of the piston 52 from the sleeve member 56. Ports 102 also are provided in the valve sleeve 86 to provide communication between the bore 86 thereof and the bore 84 when the valve member 88 is spaced from the valve seat 90 as shown in Figure 3.

The lubricant plunger 42 has a head 43 in a socket of the piston assembly with a spring 45 around the plunger in front of the head to act as a shock absorber at the beginning of the lubricant intake stroke yet provide positive connection between the piston assembly and the plunger during the lubricant discharge stroke.

As heretofore mentioned, the valve sleeve 86 is slidable relative to the bore 82. Means is provided for automatically sliding it, such means being in the form of a rod 104 having a head 106. The head is located within a cap 108 on the outer end of the valve sleeve and a spring 110 is interposed between the head and the cap. A second spring 112 is interposed between the cap and a head member 115 on the air cylinder 48.

The head 106 of the rod 104 is adjustable inwardly or outwardly relative to the air cylinder 48 to lengthen or shorten the stroke of the lubricant plunger 42 as desired. Such adjustment of the head 106 is accomplished by rotating the rod 104, a knurled head 114 being provided for this purpose. The rod itself is screw threaded as indicated at 116 in a packing nut 118. Packing is provided at 120 to prevent air leakage from the cylinder 48 around the rod 104.

*Practical operation*

In the operation of my device, assuming the parts to be in the position of Figure 2, air will enter the inlet opening 58 and exert pressure to the left on the piston 54 and pressure to the right on the piston 52. It will also flow through the openings 92, the ports 98, the bore 96 and the ports 100 to the space in the cylinder 48 to tend to push the piston 52 toward the left. Thus the forces on the piston 52 will be balanced because it is of one diameter so that the entire force on the piston 54 will be utilized to force it toward the left and expel lubricant from the cylinder 30 into the nipple 32 and hose 80. This will continue with the valve sleeve 86 moving with the piston assembly.

Finally, however, the cap 108 will strike the spring 110 and tension it, whereupon the valve sleeve 86 will remain stationary and the piston assembly will move to the position of Figure 3, wherein the valve member 88 is spaced from the seat 90 and the ports 98 are no longer in registry with the openings 92. Thereupon the compressed air in the space behind the piston 52 will flow through the ports 100, the bore 96, the ports 102, the bore 84 and the openings 94 into the cylinder 50 from which it is discharged to atmosphere through an outlet opening 120.

The compressed air flowing in through the openings 58 will now be confined between the pistons 52 and 54, and the piston assembly will move toward the right because of the greater diameter of the piston 52 over the diameter of the piston 54. The diameters are but slightly different because it does not require much force to move the plunger 42 on its intake stroke. The area of the piston 54, however, is considerably greater than the area of the plunger 42 so as to discharge the lubricant under a much higher pressure than the pressure of the compressed air used for operating the mechanism.

As long as the valve on the end of the hose (not shown on the drawing because it is now in general use) is open, the pump will continue to operate to force lubricant through the hose. When the lubricating operation is completed, however, and the valve is closed, pressure will be built up in the hose 80 and in the lubricant cylinder 30 until the air pressure from the pipe 72 cannot overcome such pressure and the piston assembly in the cylinders 48 and 50 will cease reciprocating. As soon as the lubricant valve is opened again for another lubricating operation, the pump will start operating.

When lubricant is first placed in the container 14, there will be a certain amount of air trapped therein, and in order to get rid of this air before operating the pump, I provide a set screw type of valve 122. This valve has a tapered end 124, seated against a seat 126, and is provided with a groove 128. As long as the valve is seated it is sealed against leakage, but when loosened slightly or unseated, air can leak through the groove 128 to atmosphere. The pump when being placed in operation after being supplied with lubricant is operated with the valve slightly open until lubricant starts flowing from the groove 128, whereupon it may be closed.

Regarding the valve sleeve 86, it is a working fit in the bore 82 and is held in the position of Figure 2 by the air pressure acting on the sleeve like a plunger and tending to extend it toward the left, thereby keeping the valve 88 against the valve seat 90. When the valve member is pulled away from the seat, however, as in Figure 3, there is no longer any such tendency so that when the valve is moved to either position by the head 115 or the head 116, it will stay in such position, regardless of the fact that the pistons 52 and 54 reciprocate relative to the rod 104.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

A motor comprising a cylinder having an enlarged portion and a reduced portion, a piston in each portion, tubular means connecting said pistons together for simultaneous reciprocation, means for introducing fluid pressure continuously to said cylinder between said pistons, a head on the large end of the cylinder, a slidable valve in said tubular means, a port in said tubular means communicating with the space in said cylinder between said pistons, a port in said slidable valve for affording communication between the port in said tubular means and the large end of said cylinder, means extending from said head for sliding said valve at each end of the travel of the pistons and the tubular means, said tubular means having a valve seat, an outlet from the reduced end of the cylinder and a valve plug on said slidable valve to seat against said valve seat to prevent the flow of air from the large end of the cylinder to the small end thereof when said ports permit flow of air from the space between said pistons to the large end of the cylinder and to permit flow of air from the large end of the cylinder through the tubular means to the small end thereof when said ports are out of registry to prevent flow of air from the space between said pistons to the large end of said cylinder.

WILLIAM ZWAYER.